United States Patent [19]

Sachs

[11] Patent Number: 4,526,428
[45] Date of Patent: Jul. 2, 1985

[54] MULTI-STRAND CABLE CLAMP WITH POSITIVE STRAND ENGAGEMENT

[76] Inventor: Isaac Sachs, 1240 Ridgewood Dr., Chomedey, Laval, Quebec, Canada, H7W 1L3

[21] Appl. No.: 595,480

[22] Filed: Mar. 30, 1984

[51] Int. Cl.³ .............................................. H01R 4/66
[52] U.S. Cl. ............................... 339/14 R; 24/115 R; 248/61
[58] Field of Search ...................... 339/269, 271, 14 R, 339/14 L, 203 L, 264 L, 265 F, 266 G, 266 L; 179/41, 43, 44; 24/115 R; 248/61

[56] References Cited

U.S. PATENT DOCUMENTS

| | | | |
|---|---|---|---|
| 1,258,657 | 3/1918 | Cuthbert | 339/271 |
| 2,260,219 | 10/1941 | Gates | 339/269 |
| 3,423,724 | 1/1969 | Clement | 339/269 |
| 4,014,504 | 3/1977 | Sachs | 248/61 |
| 4,461,521 | 7/1984 | Sachs | 339/14 R |

Primary Examiner—Eugene F. Desmond
Attorney, Agent, or Firm—Schwartz, Jeffery, Schwaab, Mack, Blumenthal & Evans

[57] ABSTRACT

A multi-strand cable clamp comprises a pair of opposingly disposed plate members each having an edge bent to define a jaw means for gripping a multi-strand cable, the plate members being articulated to one another for moving the jaw means between open and closed positions, and releasable coupling means interconnecting the plate members and operable to bias the jaw means to the closed position for releasably securing the cable in clamping engagement between the jaw means. The bent edge of each plate member is formed with a tooth which is inclined relative to the longitudinal axis of the cable so as to engage the cable between two successive outer strands thereof, thereby providing a positive strand engagement and preventing the plate members from pivoting about the cable as well as sliding therealong.

20 Claims, 11 Drawing Figures

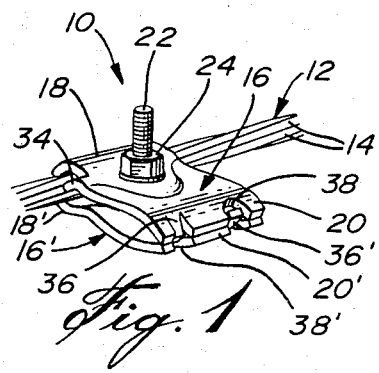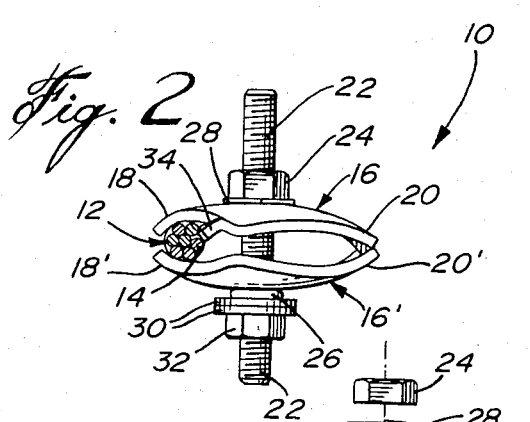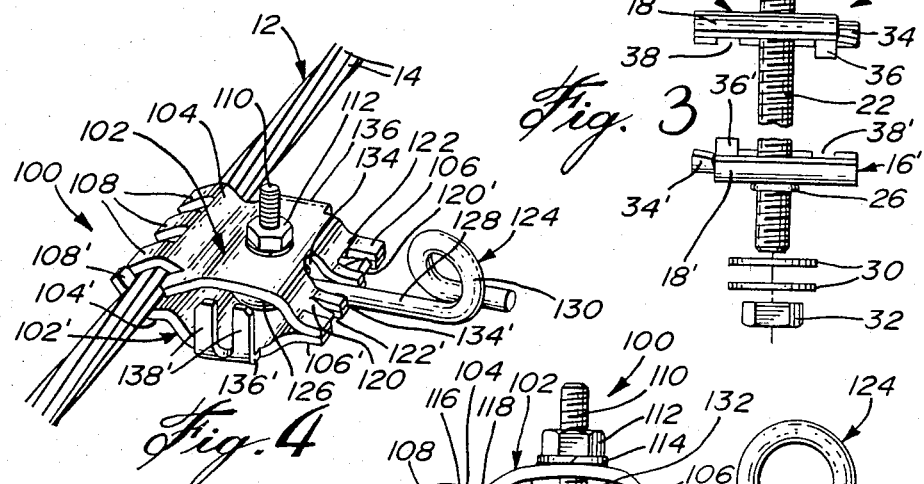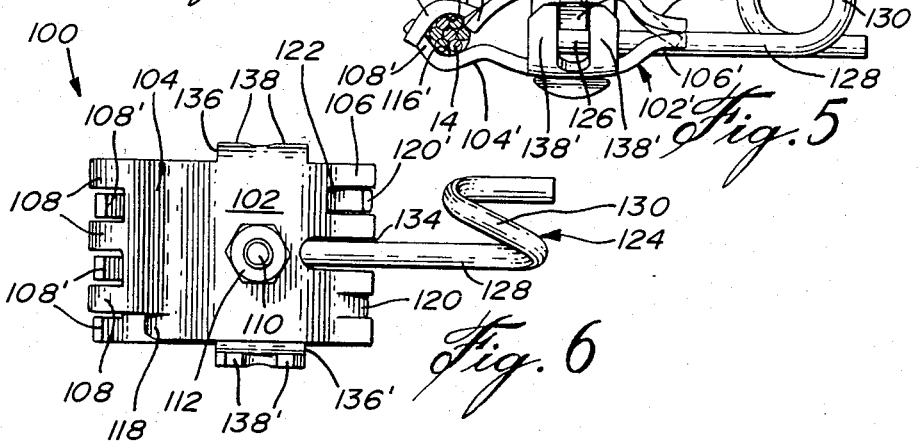

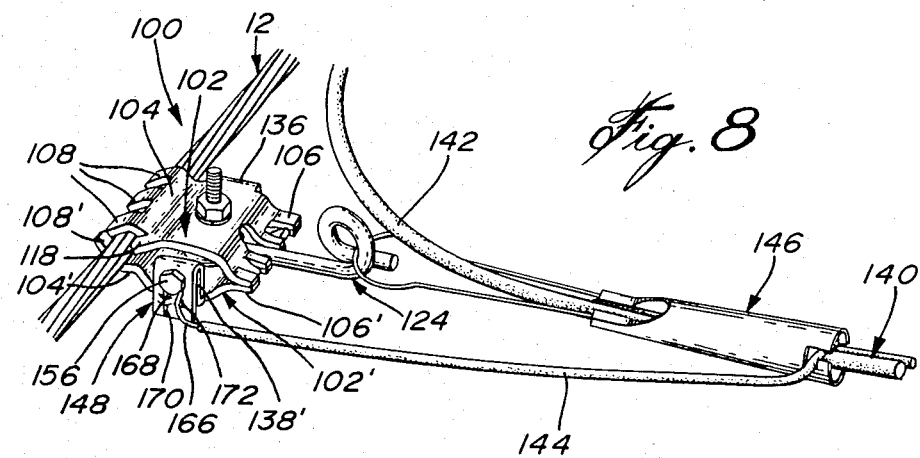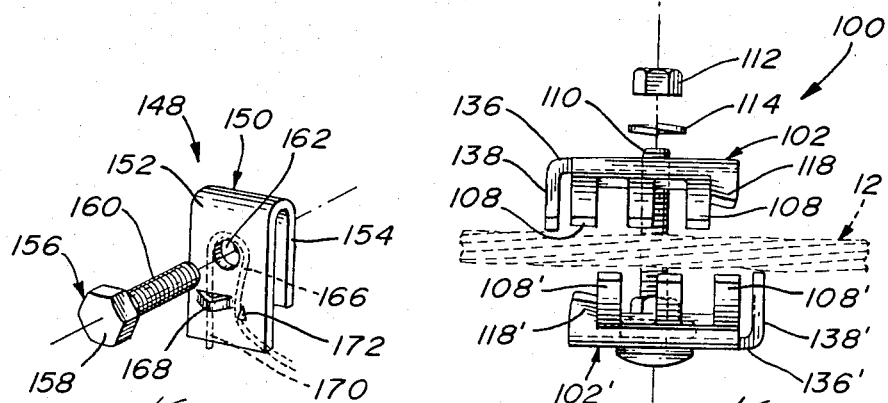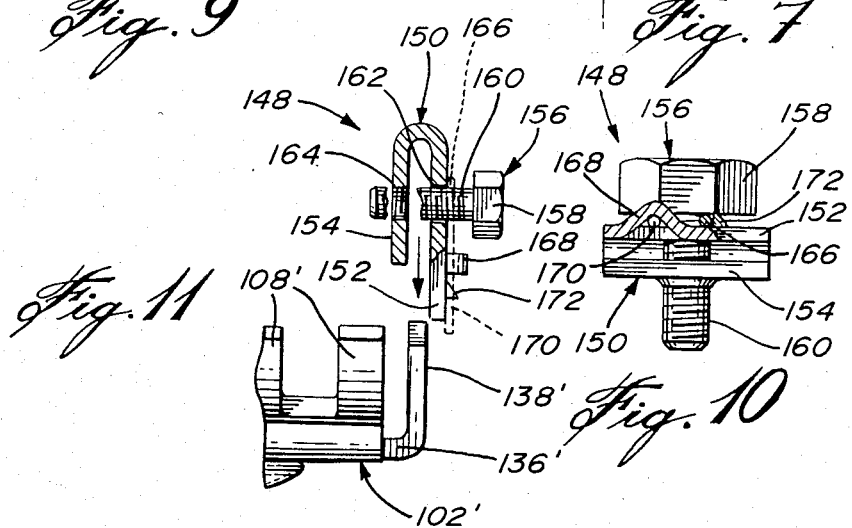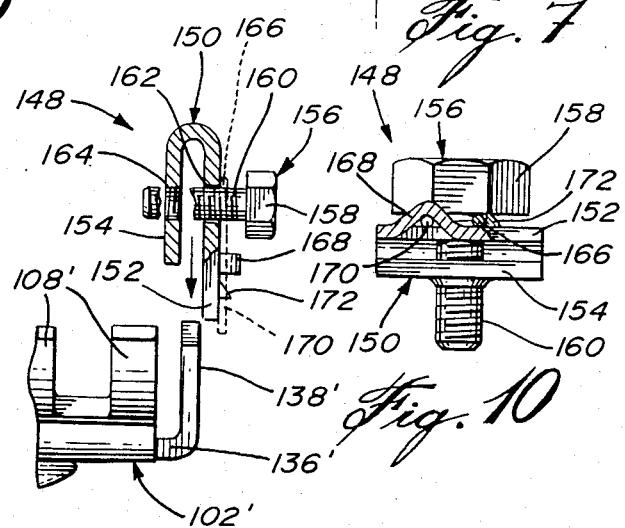

4,526,428

MULTI-STRAND CABLE CLAMP WITH POSITIVE STRAND ENGAGEMENT

BACKGROUND OF THE INVENTION

The present invention is directed towards improvements in cable clamps. More particularly, the invention is concerned with an improved multi-strand cable clamp featuring positive strand engagement.

Applicant has already described in his U.S. Pat. No. 4,014,504 of Mar. 29, 1977 a hooking device for holding a wire or the like from a suspended cable, such as a guy wire which runs between poles on a street and generally consists of a multi-strand cable. This hooking device comprises a pair of opposingly disposed plate members having respective end edges and lateral edges and arranged one over the other with the respective end edges facing one another, one end edge of each plate member being bent to define a jaw means for gripping the multi-strand cable and having fingers asymmetrically formed therealong, the other end edges of the plate members abutting one another whereby to act as a hinge for moving the jaw means between open and closed positions. Releasable coupling means interconnect the plate members and are operable to bias the jaw means to the closed position for releasably securing the cable in clamping engagement between the jaw means with the asymmetrically formed fingers interdigitating, the coupling means including a bolt having a longitudinal axis extending perpendicular to the plate members. The hooking device further comprises at least one hooking member for holding the wire or the like, the hooking member having a connecting end, a stem portion and a hooking end, the connecting end being mounted between the plate members to the bolt with the stem portion extending generally perpendicular to the bolt and out of the coupled plate members through one of the other end edges and lateral edges thereof, the other end edges and lateral edges each having guide means for orienting and maintaining a hooking member substantially perpendicular to and parallel to the cable, respectively.

The above hooking device is conveniently used for connecting a TV cable from a house directly to a nearby guy wire running between poles on a street where such poles are spaced too far from one another and it is impossible to secure the TV cable to a pole without a major portion of the cable sagging to an undesirable extent. Applicant has found that even if the device is tightly clamped to the guy wire, it may still pivot under tension about the guy wire in adverse weather conditions, causing the hooking device to slide along the guy wire and to thus damage the trunk cable extending closely parallel to the guy wire and also to interfere with the lashing wire which lashes the trunk cable to the guy wire. In addition, any sliding of the hooking device along the guy wire will increase the sagging of the TV cable, which may be hazardous to moving vehicles particularly in the case of steel messenger TV cables, and also cause signal interference in the cable.

The same problems also occur with other types of clamps, such as the lashing clamps which are used to secure the dead-end of a lashing wire to a guy wire. These generally comprise a pair of clamping plates with a bolt and nut cooperating to bias the plates towards one another so as to clamp the guy wire therebetween, the dead-end of the lashing wire being connected to the portion of the bolt which projects from one of the plates. Since there are no positive strand engagement means, the clamps tend to rotate with respect to the guy wire and also to slide therealong.

SUMMARY OF THE INVENTION

It is therefore an object of this invention to provide an improved multi-strand cable clamp having positive strand engagement means so as to prevent the clamp from pivoting about the cable as well as sliding therealong.

In accordance with the present invention, there is thus provided in a multi-strand cable clamp comprising a pair of opposingly disposed plate members each having an edge bent to define a jaw means for gripping a multi-strand cable, the plate members being articulated to one another for moving the jaw means between open and closed positions, and releasable coupling means interconnecting the plate members and operable to bias the jaw means to the closed position for releasably securing the cable in clamping engagement between the jaw means, the improvement wherein the bent edge of each plate member is formed with a tooth which is inclined relative to the longitudinal axis of the cable so as to engage the cable between two successive outer strands thereof, thereby providing a positive strand engagement and preventing the plate members from pivoting about the cable.

According to a preferred embodiment, the tooth is formed at an end edge of each plate member and adjacent a lateral edge thereof, the tooth of one plate member being arranged diagonally opposite the tooth of the other plate member when viewed facing the jaw means. Preferably, the tooth of each plate member is rectangular in cross-section.

Owing to the provision of a tooth at the bent edge of each plate member, which tooth is adapted to penetrate between two successive outer strands of the cable as the jaw means are moved to the closed position, the cable clamp of the invention securely locks on the stranded cable, thus providing a firm positive grip.

BRIEF DESCRIPTION OF THE DRAWINGS

Further advantages and features of the invention will become more readily apparent from the following description of preferred embodiments thereof as illustrated by way of examples in the accompanying drawings, in which:

FIG. 1 is a perspective view of a multi-strand cable clamp according to a first preferred embodiment of the invention;

FIG. 2 is a side view of the cable clamp illustrated in FIG. 1;

FIG. 3 is an exploded view of the cable clamp of FIG. 1;

FIG. 4 is a perspective view of another multistrand cable clamp according to a second preferred embodiment of the invention;

FIG. 5 is a side view of the cable clamp illustrated in FIG. 4;

FIG. 6 is a top view of the cable clamp of FIG. 4;

FIG. 7 is an exploded view of the cable clamp of FIG. 4;

FIG. 8 is a perspective view showing the cable clamp of FIG. 4 clamped to a stranded cable and holding a messenger coaxial cable with the messenger wire being grounded to the clamp;

FIG. 9 is a perspective view of the grounding connector used to connect the messenger wire to the cable clamp as illustrated in FIG. 8;

FIG. 10 is a bottom view of the grounding connector shown in FIG. 9; and

FIG. 11 is a fragmentary part-sectional view showing how the grounding connector of FIG. 9 is mounted to the cable clamp illustrated in FIG. 8.

DESCRIPTION OF PREFERRED EMBODIMENTS

Referring first to FIGS. 1–3, there is illustrated a lashing clamp which is generally designated by reference numeral 10 and seen clamped to a multi-strand cable 12 made of a plurality of strands 14 twisted together. The clamp 10 comprises a pair of identically shaped plate members 16 and 16' having respective end edges 18,20 and 18',20' and disposed one over the other with the respective end edges facing one another. The end edges 18 and 18' of the plate members 16 and 16' are bent to define opposed jaws cooperating to clamp the cable 12 therebetween, whereas the end edges 20 and 20' abut one another whereby to act as a hinge allowing movement of the jaws between open and closed positions. Releasable coupling means consisting of a thru bolt 22 and nut 24 are provided for moving the jaws defined at the end edges 18,18' to the closed position so as to secure the cable 12 in clamping engagement between the jaws, the bolt 22 being fixed to the plate member 16' as at 26. The longitudinal axis of the bolt 22 extends perpendicular to the plate members 16 and 16'. A lock-washer 28 is interposed between the plate member 16 and the nut 24 for securely retaining the plate members together in the closed position. The dead-end of the lashing wire (not shown) is connected to the bolt 22 between the washers 30 and is held in place by means of the nut 32.

In order to prevent the clamp 10 from pivoting about the cable 12 as well as sliding therealong, the end edges 18,18' of the plate members 16 and 16' are formed with respective projecting teeth 34,34' of rectangular cross-section, each tooth being disposed adjacent one lateral edge of a plate member and being inclined relative to the longitudinal axis of the cable 12 so as to engage the cable between two successive outer strands 14 thereof, as best shown in FIG. 2. The tooth 34 of the plate member 16 is arranged diagonally opposite the tooth 34' of the other plate member 16' when viewed facing the end edges 18,18', as shown in FIG. 3. These teeth bite into the cable 12 as they penetrate between the outer strands 14 when the jaws defined at the end edges 18,18' are moved to the closed position by means of the bolt 22 and nut 24, thus providing a positive strand engagement.

The clamp 10 is further provided with guide means for preventing misalignment of the jaws during opening or closing thereof. Such guide means include a projection 36 on the plate member 16 at its end edge 20 and a corresponding notch 38' formed in the plate member 16' at its end edge 20', into which the projection 36 is inserted. A similar guide projection 36' is also provided on the plate member 16', which is spaced from the notch 38' and inserted into a corresponding notch 38 formed in the plate member 16, such that corresponding guide projections and notches are inserted in one another.

As shown, the plate members 16 and 16' are outwardly bulged between the end edges thereof so as to resist deformation during repeated use of the clamp 10.

Turning now to FIGS. 4–7, there is illustrated a hooking device 100 which has been improved over Applicant's earlier device described in the aforementioned U.S. Pat. No. 4,014,504. The hooking device 100 comprises a pair of identically shaped plate members 102 and 102' having respective end edges 104,106 and 104',106' and disposed one over the other with the respective end edges facing one another. The end edges 104 and 104' of the plate members 102 and 102' are bent to define opposed jaws cooperating to clamp the cable 12 therebetween, and have a plurality of gripping fingers 108 and 108' asymmetrically formed therealong. The other end edges 106 and 106' abut one another whereby to act as a hinge allowing movement of the jaws between open and closed positions. Releasable coupling means consisting of a bolt 110 and nut 112 are provided for moving the jaws defined at the end edges 104,104' to the closed position so as to secure the cable 12 in clamping engagement between the jaws with the asymmetrically formed fingers 108,108' interdigitating. The longitudinal axis of the bolt 110 extends perpendicular to the plate members 102 and 102'. A lock-washer 114 is interposed between the plate member 102 and the nut 112 for securely retaining the plate members together in the closed position. As shown in FIG. 5, the end edges 104,104' of the plate members 102 and 102' together with the fingers 108,108' define respective channels 116 and 116' for sittingly receiving the cable 12 in clamping engagement between the jaws.

In order to prevent the hooking device 100 from rotating with respect to the cable 12 as well as sliding therealong, the end edges 104,104' of the plate members 102 and 102' are formed with respective projecting teeth 118,118' of rectangular cross-section, each tooth being disposed adjacent one lateral edge of a plate member and being inclined relative to the longitudinal axis of the cable 12 so as to engage the cable between two successive outer strands 14 thereof, as best shown in FIG. 5. The tooth 118 of the plate member 112 is arranged diagonally opposite the tooth 118' of the other plate member 102' when viewed facing the gripping fingers 108,108', as shown in FIG. 7. These teeth bite into the cable 12 as they penetrate between the outer strands 14 when the jaws defined at the end edges 104,104' are moved to the closed position by means of the bolt 110 and nut 112, thus providing a positive strand engagement.

The hooking device 100 is further provided with guide means for preventing misalignment of the jaws during opening or closing thereof. Such guide means include a projection 120 on the plate member 102 at its end edge 106 and a corresponding notch 122' formed in the plate member 102' at its end edge 106', into which the projection 120 is inserted. A similar guide projection 120' is also provided on the plate member 102', which is spaced from the notch 122' and inserted into a corresponding notch 122 formed in the plate member 102, such that corresponding guide projections and notches are inserted in one another.

The hooking device 100 is also provided with at least one hooking member 124 having a connecting end 126, a stem portion 128 and a hooking end 130. The connecting end 126 of the hooking member 124 is mounted between the plate members 102 and 102' to the bolt 110 and held in place by means of the nut 132, the stem portion 128 extending perpendicular to the bolt and out of the plate members through the end edges 106,106'. Aligned openings 134 and 134' are formed in the plate members 102 and 102' and located centrally along the end edges 106 and 106', the openings 134,134' receiving therethrough the stem portion 128 of the hooking member 124 and thus serving as guide means for orienting and maintaining the hooking member 124 substantially perpendicular to the cable 12. It is also possible for the hooking member 124 to extend out of the plate members 102 and 102' through the lateral edges thereof. To this end, a lateral guide projection is provided on either side of the hooking device 100 for orienting and maintaining a hooking member 124 substantially parallel to the cable 12. As best shown in FIGS. 6 and 7, such lateral guide projection comprises a first portion 136 extending laterally of the plate member 102 and a second portion which extends in a direction generally perpendicular to the plate member 102 and is bifurcated to define a pair of spaced-apart prongs 138 adapted to receive therebetween the stem portion 128 of a hooking member 124. The plate member 102' is similarly formed with a lateral extension 136' and a pair of spaced-apart prongs 138'. It should be noted that since the prongs 138,138' are secured at their bases consisting of the lateral extensions 136,136' which are remote from the lateral edges of the plate members 102 and 102', the space defined between the prongs does not tend to weaken the strength of the plate members nor do the prongs tend to open after a certain period of time, as was the case with Applicant's former hooking device in which the prongs projected directly from the lateral edges.

As shown, the plate members 102 and 102' are outwardly bulged between the end edges thereof whereby to resist deformation during repeated use of the device 100.

FIG. 8 shows how the hooking device 100 may be used for holding a messenger cable 140 consisting of a coaxial cable 142 operative to transmit a signal, for example a TV signal, and a steel messenger wire 144 which is connected to the cable 142 and extends therealong for supporting it. To this end, a dead-end messenger wire holder 146 such as described in Applicant's copending U.S. application No. 477,387, filed Mar. 31, 1983. is advantageously utilized, which is hooked to the hooking member 124 of the device 100. The messenger wire 144 is grounded to the hooking device 100 by means of a specially designed grounding connector 148 which is adapted to fit onto the prongs 138 or 138'.

As shown in FIGS. 9–11, the grounding connector 148 comprises a generally U-shaped bracket member 150 having a pair of opposed arms 152 and 154 adapted to fit over the prongs 138' with the prongs 138' being disposed between the arms 152 and 154 (as best shown in FIG. 11), and a bolt 156 having a head 158 and a threaded stem 160, the threaded stem 160 extending through a bore 162 in the arm 152 and between the prongs 138' and being in threadable engagement with a threaded bore 164 in the arm 154. The bolt 156 thus serves to releasably secure the connecting portion 166 of the the messenger wire 144 against the arm 152 while simultaneously securing the bracket member 150 to the prongs 138'.

In order to facilitate the connecting of the messenger wire 144 to the bracket member 150, there is provided a wire end retention means consisting of an apertured protrusion 168 which is formed on the arm 152 and located adjacent the bore 162 for receiving the terminal end 170 of the messenger wire 144 so as to allow the connecting portion 166 to be wrapped around the stem 160 of the bolt 156 and formed into an open loop defining a throat, while the terminal end 170 is retained captive in the apertured protrusion 168. This enables the looped connecting portion 166 thus formed to be substantially entirely disposed underneath the head 158 of the bolt 156, as best shown in FIG. 10. A guide abutment 172 is also provided on the arm 152 for arresting a segment of the looped connecting portion 166 which extends closely opposite the apertured protrusion 168. As shown, the guide abutment 172 is disposed in spaced relation to the bore 162 and the protrusion 168 so as to maintain the looped connecting portion of the wire positioned underneath the head 158 of the bolt 156 and thus prevent same from expanding laterally when the bolt 156 is tightened and the head 158 frictionally engages the looped connecting portion 166 to securely press same against the arm 152.

I claim:

1. In a multi-strand cable clamp comprising a pair of opposingly disposed plate members each having an edge bent to define a jaw means for gripping a multi-strand cable, said plate members being articulated to one another for moving said jaw means between open and closed positions, and releasable coupling means interconnecting said plate members and operable to bias said jaw means to said closed position for releasably securing said cable in clamping engagement between said jaw means, the improvement wherein said edge of each said plate member is formed with a tooth which is inclined relative to the longitudinal axis of said cable so as to engage said cable between two successive outer strands thereof, thereby providing a positive strand engagement and preventing said plate members from pivoting about said cable and sliding therealong.

2. A cable clamp as claimed in claim 1, wherein said tooth is formed at an end edge of each said plate member and adjacent a lateral edge thereof, the tooth of one plate member being arranged diagonally opposite the tooth of the other plate member when viewed facing said jaw means.

3. A cable clamp as claimed in claim 1, wherein said plate members have respective end edges and lateral edges and are disposed one over the other with the respective end edges facing one another, one end edge of each said plate member being bent to define said jaw means with said tooth being formed at said one end edge, and the other end edges of said plate members abutting one another whereby to act as a hinge allowing adjustable clamping of said cable between said jaw means by operation of said coupling means.

4. A cable clamp as claimed in claim 3, wherein said tooth is formed adjacent one lateral edge of each said plate member, the tooth of said one plate member being arranged diagonally opposite the tooth of the other plate member when viewed facing said jaw means.

5. A cable clamp as claimed in claim 4, further including guide means for preventing misalignment of said jaw means during opening or closing thereof.

6. A cable clamp as claimed in claim 5, wherein said guide means comprise a projection on one of said plate members at its other end edge and a corresponding notch formed in the other plate member at its other end edge, said projection being inserted in said corresponding notch.

7. A cable clamp as claimed in claim 6, wherein each said plate member is formed at said other end edge thereof with said projection and said notch spaced therefrom, corresponding projections and notches of said plate members being inserted in one another.

8. A cable clamp as claimed in claim 3, wherein each said plate member is outwardly bulged between the end edges thereof whereby to resist deformation during repeated use.

9. A cable clamp as claimed in claim 1, wherein the tooth of each said plate member is rectangular in cross-section.

10. In a hooking device for holding a wire or the like from a suspended multi-strand cable, said hooking device comprising a pair of opposingly disposed plate members having respective end edges and lateral edges and arranged one over the other with the respective end edges facing one another, one end edge of each said plate member being bent to define a jaw means for gripping said multi-strand cable and having fingers asymmetrically formed therealong, the other end edges of said plate members abutting one another whereby to act as a hinge for moving said jaw means between open and closed positions, releasable coupling means interconnecting said plate members and operable to bias said jaw means to said closed position for releasably securing said cable in clamping engagement between said jaw means with said asymmetrically formed fingers interdigitating, said coupling means including a bolt having a longitudinal axis extending perpendicular to said plate members, and at least one hooking member for holding said wire or the like, said hooking member having a connecting end, a stem portion and a hooking end, said connecting end being mounted between said plate members to said bolt with said stem portion extending generally perpendicular to said bolt and out of said coupled plate members through one of said other end edges and lateral edges thereof, said other end edges and lateral edges each having guide means for orienting and maintaining a hooking member substantially perpendicular to and parallel to said cable, respectively, the improvement wherein said one end edge of each said plate member is formed with a projecting tooth which is inclined relative to the longitudinal axis of said cable so as to engage said cable between two successive outer strands thereof, thereby providing a positive strand engagement and preventing said plate members from pivoting about said cable and sliding therealong.

11. A hooking device as claimed in claim 10, wherein said tooth is formed adjacent one lateral edge of each said plate member, the tooth of one plate member being arranged diagonally opposite the tooth of the other plate member when viewed facing said jaw means.

12. A hooking device as claimed in claim 10, wherein said guide means at said lateral edges of said plate members comprise a guide projection having a first portion extending laterally of each said plate member at one lateral edge thereof and a second portion extending in a direction generally perpendicular to said plate member, said second portion being bifurcated to define a pair of spaced-apart prongs adapted to receive therebetween the stem portion of a hooking member.

13. A hooking device as claimed in claim 10, wherein said guide means at said other end edges of said plate members comprise aligned openings formed in said plate members and located centrally along said other end edges thereof, said aligned opening being adapted to receive therethrough the stem portion of a hooking member.

14. A hooking device as claimed in claim 10, further including means for preventing misalignment of said jaw means during opening or closing thereof.

15. A hooking device as claimed in claim 10, wherein said one end edge of each said plate member together with said asymmetrically formed fingers thereof define a channel for sittingly receiving said cable when said cable is clamped between said jaw means.

16. A hooking device as claimed in claim 10, wherein each said plate member is outwardly bulged between the end edges thereof whereby to resist deformation during repeated use.

17. A hooking device as claimed in claim 12, further including grounding connector means mounted to said bifurcated portion of said guide projection of one said plate member for connecting a wire to be grounded, said wire having a terminal end and a connecting portion contiguous thereto.

18. A hooking device as claimed in claim 17, wherein said grounding connector means comprise a generally U-shaped bracket member having opposed first and second arms and adapted to fit over said bifurcated portion of said guide projection with said prongs being disposed between said first and second arms, and fastener means for releasably securing said connecting portion of said wire against said first arm while simultaneously securing said bracket member to said bifurcated portion of said guide projection, said first arm being provided with wire end retention means for retaining said terminal end of said wire whereby to allow said connecting portion to be bent about said fastener means and formed into an open loop defining a throat while said terminal end is retained captive by said wire end retention means, prior to said connecting portion being secured by said fastener means, said bracket member further including guide means formed on said first arm and disposed adjacent said throat for arresting a segment of the looped connecting portion of said wire which extends closely opposite said wire end retention means.

19. A hooking device as claimed in claim 18, wherein said releasable fastener means comprises a bolt having a head and a threaded stem, said threaded stem extending through a bore in said first arm and between said prongs and being in threadable engagement with a threaded bore in said second arm, and wherein said wire end retention means comprises an apertured protrusion formed on said first arm and located adjacent said bore thereof for receiving the terminal end of said wire while enabling said connecting portion to be wrapped around said stem with said loop being substantially entirely disposed underneath said head.

20. A hooking device as claimed in claim 19, wherein said guide means on said first arm comprises a guide abutment disposed in spaced relation to said bore of said first arm and said apertured protrusion for maintaining the looped connecting portion of said wire positioned underneath said head and preventing same from expanding laterally when said bolt is tightened and said head thereof frictionally engages said looped connecting portion to securely press same against said first arm.

* * * * *